3,377,443
ELECTRICAL CONDUCTOR CLAMPING MEANS
FOR RAPID TRANSIT ELECTRIFICATION
Sigurd O. Rodeseike, Greensburg, Pa., assignor to I-T-E Circuit Breaker Company, Philadelphia, Pa., a corporation of Pennsylvania
Filed Nov. 12, 1964, Ser. No. 410,448
3 Claims. (Cl. 191—29)

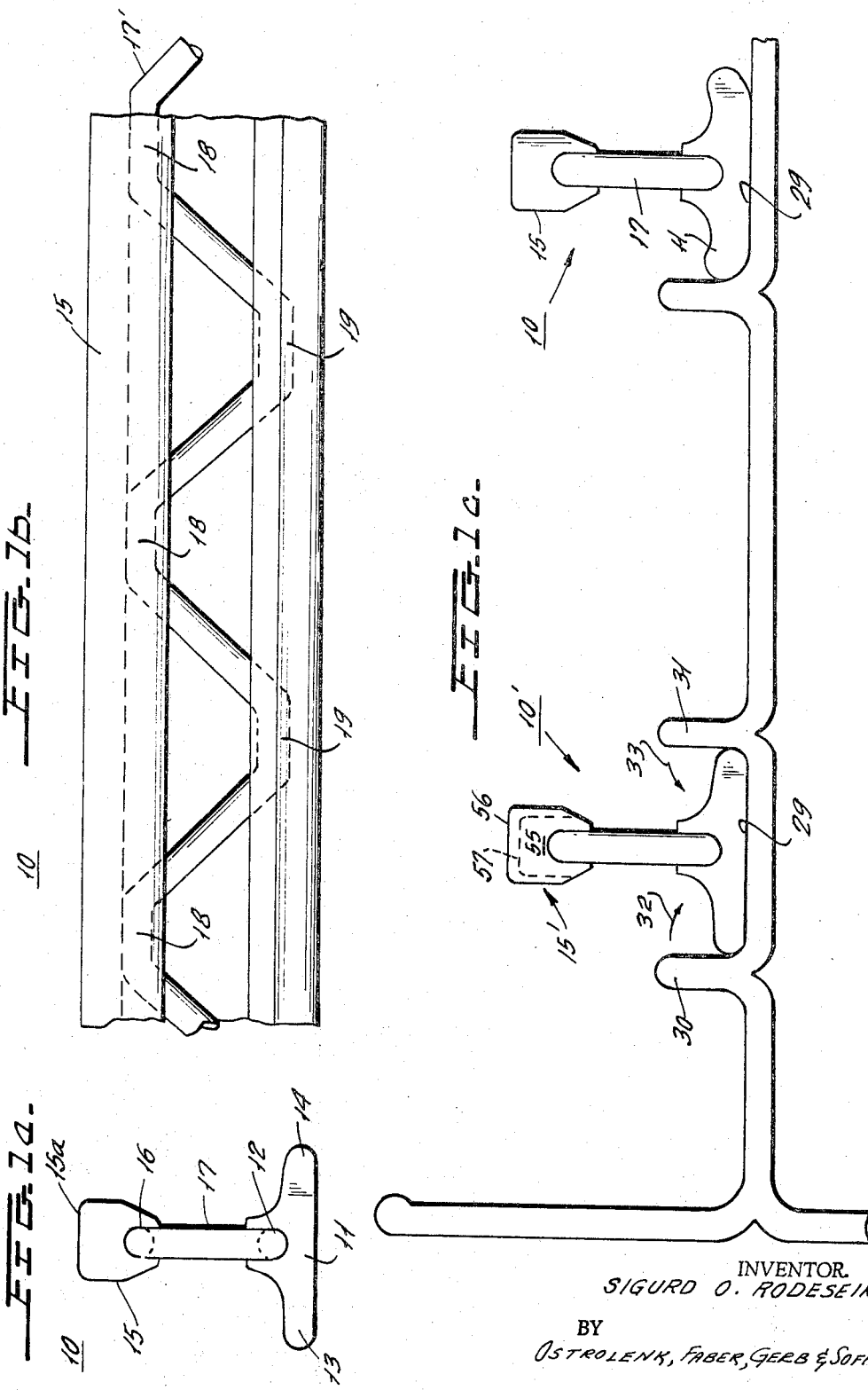

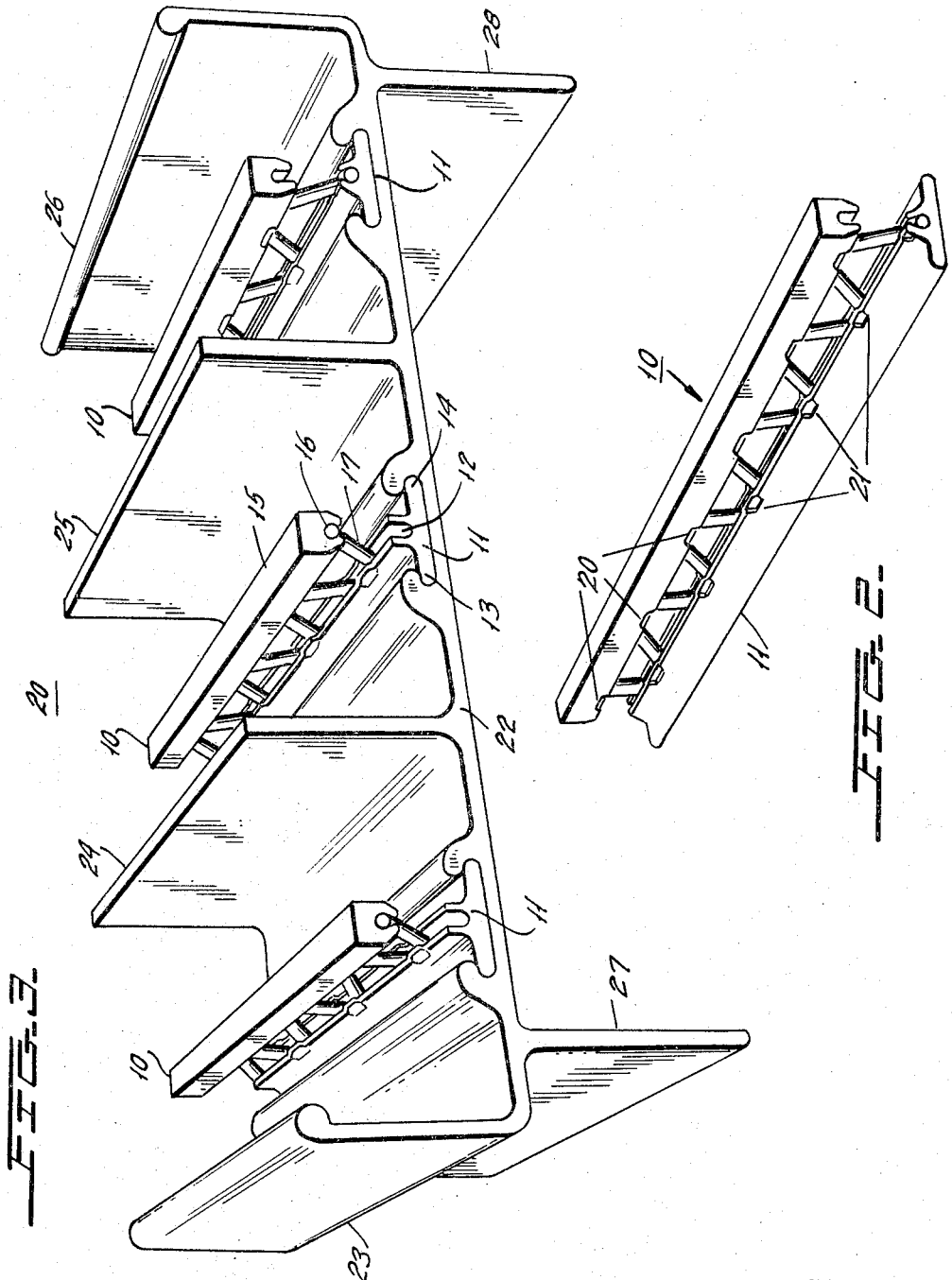

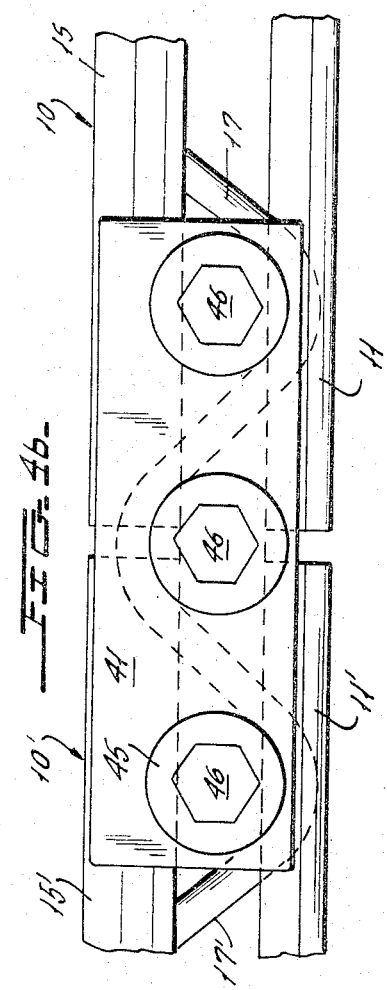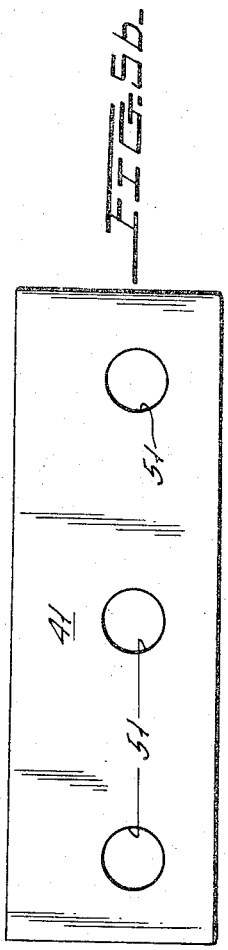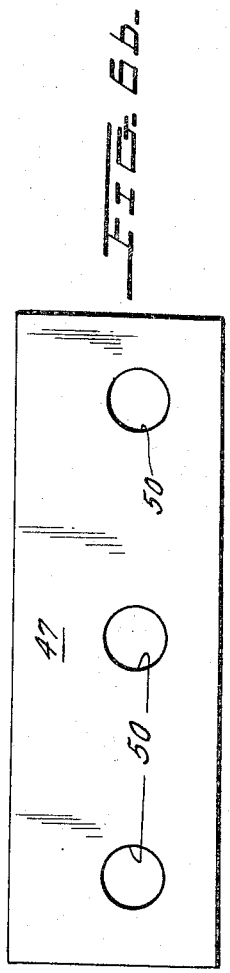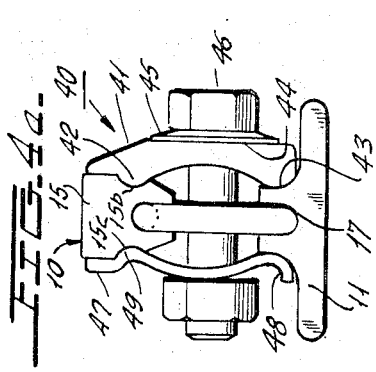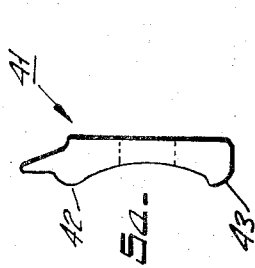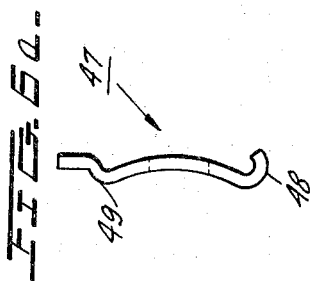
INVENTOR.
SIGURD O. RODESEIKE
BY
OSTROLENK, FABER, GERB & SOFFEN
ATTORNEYS United States Patent Office 3,377,443
Patented Apr. 9, 1968

ABSTRACT OF THE DISCLOSURE

Means for joining conductors end-to-end, comprising two elongated clamping elements which extend across the gap between the conductors and are positioned along opposite sides of the conductors being joined; one of the clamping elements being flexible, whereby the conductor joints can readjust for variations in temperature conditions; as an alternate embodiment both clamping elements being rigid and being held to the conductors by a fastening means having a spring washer thereon to absorb stresses of conductor repositioning due to temperature variation; as an alternate embodiment a truss consisting of an elongated rod having a serpentine configuration, which truss connects a conductive surface of a conductor to a supporting base, the clamping elements being positioned alongside the truss and the fastening means for the clamping elements passing through the spaces in the truss, whereby the clamping means will not interfere with readjustment of the conductor assembly for temperature conditions.

The instant invention relates to rapid transit electrical electrification systems and more particularly to a novel conductor for use in rapid transit electrification systems such as three-phase third rail systems wherein a novel conductor means is provided having substantial strength and stiffness, while providing excellent conductivity characteristics in a highly economical arrangement.

It is well known to provide transit systems for the transportation of large numbers of people. Typical transit systems are subway or elevated systems which can presently be found to exist in a large number of metropolitan areas throughout the world. It is typical in such systems to provide running railways upon which the transit cars may operate and further to provide electrification means in the form of a "third rail" which is designed to provide D.C. power for electrification of the transit cars. Such systems are typically designed to operate at speeds in the order of 35 miles per hour.

Due to present-day requirements, rapid transit systems are presently being developed with such systems being designed to have the capabilities of traveling at speeds of greater than 75 miles per hour and having rapid acceleration capabilities so as to rapidly attain cruising speeds. Such rapid transit systems are designed to service extremely large areas extending for a distance of greater than 75 miles from one end to the other. In order to provide minimum power attenuation over such lengths, it is desirable to provide an A.C. electrification system. In addition thereto, it is highly desirable to increase the efficiency of such a system by providing three-phase A.C. power for electrification of the transit cars.

The conductors or bus bars of such a three-phase A.C. third rail assembly must therefore be continuous structures running the entire length of the transit network and have extremely good conductivity properties. In addition thereto, the conductors are designed to make wiping contact with the shoes of the rapid transit cars and therefore must be further designed to provide high abrasive resistance so as to minimize wear due to the wiping contact arrangement. Also, due to the great lengths of such a network, it is desirable to provide a bus bar assembly which is extremely economical so as to prevent the raw material and fabrication costs from making such a system prohibitive.

The instant invention provides a novel conductor assembly having the characteristics of extreme rigidity and stiffness, excellent conductivity properties, high abrasive resistance characteristics and further, embodying a design which is most economical in raw material and fabrication costs.

The conductor of the instant invention is basically a three-element assembly and is comprised of a rigid base portion, preferably formed of steel, a head portion formed of a high conductivity material, preferably copper, and a connecting truss portion comprised of a continuous rod which is formed or bent in a serpentine fashion. The truss portion is positioned within suitable grooves provided in the base and head portions which are then crimped to rigidly secure the truss portion of the assembly to the base and head portions. The head portion of the conductor assembly exhibits excellent conductivity and high abrasive resistance characteristics so as to provide an excellent conductive surface for contact with the shoe of a rapid transit car. The base portion is suitably designed for connection to a suitable support assembly for the conductive means. The truss portion provides excellent strength, stiffness and rigidity characteristics for the conductor assembly enabling it to withstand extremely severe vibrational forces which are experienced during the time that the transit car shoe makes wiping engagement with the conductive head.

The truss portion has excellent radiation characteristics which due to its truss-like design enables any heat generated due to the current flow therethrough to be rapidly passed to the surrounding atmosphere. The truss design, while providing excellent stiffness, support and ragidity characteristics, also substantially diminishes the amount of raw material needed for the conductor assembly when compared with typical present day conductors having a substantially solid rail-head, cross-section over the entire length of the conductor assembly. The open areas, so to speak, of the conductor assembly of the instant invention avoids the need for much additional raw material while at the same time maintaining the same characteristics of strength and rigidity provided in present day assemblies.

The conductor assembly of the instant invention is normally formed in sections of predetermined lengths, preferably in lengths of 40 feet. However, it should be understood that the sections may be any other desired length. In installations where the conductor assemblies are to extend over great lengths such as for many miles, it thereby becomes necessary to join adjacent sections so as to maintain alignment and physical and electrical contact therebetween. Novel means are thereby provided for performing the above functions with the clamping means being comprised of first and second clamp members having configurations which dovetail or interlock with the configuration of the conductor assembly. The first and second clamp members are positioned so as to bridge adjacent sections of conductor assemblies and are secured to one another and maintain and rigidly position the conductor assemblies through the use of suitable fastening means. In the case where a certain amount of physical movement between adjacent conductor assemblies may exist, it is desirable to provide a flexible or sliding clamp assembly which may be comprised of at least one flexible clamp member which is biased against the conductor assembly by the fastening means. As an alternative assembly, rigid clamp members may be provided and may be rigidly biased toward one another with a flexible fastening means employing Belleville washers which act to provide the necessary resiliency.

It is therefore one object of the instant invention to provide a novel conductor assembly for use in rapid transit electrification systems.

Another object of the instant invention is to provide a novel conductor assembly for use in rapid transit electrification systems and the like comprising a three-element conductor assembly.

Another object of the instant invention is to provide a novel conductor assembly for use in rapid transit electrification systems and the like comprising a three-element conductor assembly which is comprised of a conductive head, rigid base and truss portion.

Another object of the instant invention is to provide a novel conductor assembly for use in rapid transit electrification systems and the like comprising a three-element conductor assembly which is comprised of a conductive head, rigid base and truss portion wherein the conductive head has excellent conductivity and high abrasive resistance characteristics.

Another object of the instant invention is to provide a novel conductor assembly for use in rapid transit electrification systems and the like comprising a three-element conductor assembly which is comprised of a conductive head, rigid base and truss portion wherein the truss portion provides adequate strength and rigidity characteristics, while at the same time substantially diminishng the amount of raw materal needed in the conductor assembly Another object of the instant invention is to provide a novel conductor assembly for use in rapid transit electrification systems and the like comprising a three-element conductor assembly which is comprised of a conductive head, rigid base and truss portion wherein the conductive head has excellent conductivity and high abrasive resistance characteristics wherein the base portion provides adequate means for securement to a third rail insulating support member.

Another object of the instant invention is to provide novel clamping means for clamping adjacent sections of conductor assemblies.

Still another object of the instant invention is to provide novel clamping means for clamping adjacent sections of conductor assemblies wherein mechanical and electrical engagement is maintained therethrough and wherein the adjacent conductor assembly sections are maintained in perfect alignment at the base as well as at the top of the joined sections.

Another object of the instant invention is to provide novel clamping means for joining adjacent sections of conductor assemblies wherein the clamping means has at least one flexible member in order to provide a sliding joint connection between the adjacent conductor assembly sections.

These and other objects will become apparent when reading the accompanying description and drawings in which:

FIGURE 1a is a cross-sectional view of a conductor assembly designed in accordance with the principles of the instant invention.

FIGURE 1b is a side view of the conductor assembly of FIGURE 1a.

FIGURE 1c shows the manner in which the conductor assembly of FIGURES 1a and 1b may be mounted to an insulating support member.

FIGURE 2 is a perspective view showing the conductor assembly of FIGURES 1a and 1b.

FIGURE 3 is a perspective view showing the conductor assembly of the instant invention used in a three-phase A.C. third rail arrangement.

FIGURES 4a and 4b are end and side views, respectively, of the clamping assembly employed for joining adjacent sections of conductor assemblies.

FIGURES 5a and 5b are end and side views, respectively, of one clamp member shown in FIGURES 4a and 4b.

FIGURES 6a and 6b are end and side views, respectively, of one clamp member shown in FIGURE 4a.

Referring now to the drawings and more particularly to FIGURES 1a, 1b and 2, there is shown therein a conductor assembly 10 comprised of an elongated base member 11 having a continuous groove 12 extending along its entire length and having tapered arms 13 and 14 extending from the central portion thereof for suitable connection to an insulating support member in a manner to be more fully described.

The conductor assembly 10 is further comprised of an elongated head portion 15 having a flat contact surface 15a and a continuous groove 16 extending along its entire length.

Positioned between members 11 and 15 is a rod portion 17 bent or formed in the serpentine pattern, best shown in FIGURES 1b and 2, with the upper bends 18 being positioned in the groove 16 of conductive head 15 and with the lower bends 19 being positioned within the groove 12 provided in the base 11. The rod portion 17, bent in the serpentine pattern so as to form a truss arrangement, is rigidly secured to the conductive head 15 and to the base member 11 by means of the crimps 20 and 21, respectively, provided along the members 15 and 11, respectively. These crimps may be provided by any suitable tool or machine and act to pinch in the sides of the grooves 16 and 12, respectively, so as to rigidly secure the serpentine rod 17 thereto.

The base member 11 is preferably formed of steel and may be shaped by either a cold finish or extrusion process. The truss arrangement formed from the bar 17 may be preferably formed from a steel rod which may be bent by hand or any mechanized or automated process.

The conductive head 15 may also be formed by a cold finish or extrusion process and is preferably formed from copper which provides excellent conductivity and high abrasive resistance characteristics.

The surface 15a of conductive head 15 is designed to make wiping contact with the shoe (not shown) of a rapid transit car and hence will withstand severe wearing due to this wiping contact because of its high abrasive resistance qualities.

It should be understood that the materials recited above and which are used in the manufacture of the conductor assembly, are merely exemplary and a variety of other materials may be selected. As a further example, the conducting head means 15 may be formed of copper, the rod means 17 may be formed of non-magnetic steel and the base member 11 may be formed of a conductive material such as aluminum. It should further be understood that the serpentine rod member 17 need not be exclusively relied upon as the means for transfer of electrical current from the head conducting means 15 to the base conducting means 11. This function may amply by carried out by the crimping assemblies which are to be more fully described.

The rod means when formed of a non-magnetic steel presents a much lower reactance for the same phase space than would occur if magnetic materials were chosen. This consideration is likewise applicable to the selection of non-magnetic materials for the head 15 and base member 11.

When forming the head member 15 of copper, the base member 11 of aluminum and the truss 17 of stainless steel, the serpentine stainless steel rod separates the aluminum from the copper by a sufficient distance to preclude electrolytic corrosion of copper and aluminum. The serpentine or truss like structure also further acts to prevent an accumulation of water which would lead to bridging between the aluminum conducting means 11 and the copper conducting means 15 if a solid eyebeam construction were used.

Comparing the arrangement of FIGURES 1a, 1b and 2 with present day arrangements, it can be seen that the use of the rod configuration 17 to form a truss arrangement provides extremely rigid and stiff characteristics due to its truss arrangements so as to limit forces upon the conductor assembly 10 to those of tension and compression only. In present day conductor structures, the cross-section of the conductor is a continuous solid cross-section, thus requiring a substantially large amount of raw material to form a conductor. The open areas of the truss arrangement, in addition to greatly diminishing the amount of raw material needed for the assembly, provides excellent radiation characteristics, enabling heat which may be caused due to current flow to the conductor to be easily and rapidly radiated to the surrounding atmosphere. The serpentine rod 17 acts as a resilient member between the conducting head means 15 and the base means 11 to accommodate for differences in expansion characteristics that may exist between the base means material and the head means material. FIGURE 1c shows one manner in which the conductor assembly 10 may be mounted to insulating support means. A completed insulating assembly of the type shown in FIGURE 1c, is also shown in FIGURE 3 and reference will likewise be made thereto.

In cases where it is desired to employ the conductor assembly of the instant invention in a three-phase third rail system, the assembly 20 of FIGURES 1c and 3 may be employed. Such a three-phase third rail system is described in detail in United States patent application Ser. No. 400,048, filed by Sigurd O. Rodeseike on Sept. 29, 1964 and assigned to the assignee of the instant invention, and a detailed description thereof will be omitted, with the description of United States Ser. No. 400,048, now abandoned, being incorporated herein by reference thereto. Basically, it is sufficient to understand that the assembly of FIGURES 1c and 3 is that which may be employed in a three-phase A.C. third rail arrangement for use in rapid transit systems. The assembly 20 is comprised of an insulating member 21, preferably formed from a polyethylene material and having a central portion 22 with insulating barriers 23–26 extending therefrom in a first direction and with support arms 27 and 28 extending therefrom in the opposite direction. The insulating barriers 24 and 25 act to separate adjacent conductor assemblies 10 so as to minimize the possibility of arcing therebetween. The insulating barriers 24 and 25, together with the upper and lowermost barriers 23 and 26 further act to protect the conductor assemblies against the elements and act to prevent accidental contact by maintenance or other personnel with the conductive members. It can clearly be seen that the insulating barriers 23–26 all extend in a first direction to a distance greater than the distance to which the conductor assemblies 10 extend from the central portion 21. In a typical application, the insulating support member 21 has its central portion 22 aligned in the vertical direction and positioned alongside the running rails of a transit system (not shown) so as to present the conductor assemblies 10 for making sliding contact with the shoes (not shown) of the transit cars.

Each conductor assembly 10 is positioned within a groove 29 boarded by flanges 30 and 31 at opposite sides thereof. Once the conductor assembly is positioned in the manner shown in FIGURE 1c, the flanges 30 and 31 are bent downwardly in the direction shown by arrows 32 and 33, respectively, so as to rigidly secure the conductor assembly 10 to the insulating member 21. This may be done by a continuous process which may employ both heat and pressure, or the assembly may be performed by mounting the conductor assemblies 10 to the insulating member 21 during the extrusion process which is employed for the purpose of forming the insulating member 21. A variety of other methods by which to mount the conductor assembly 10 to the insulating member 21 are set forth in detail in the aforementioned copending United States No. 400,048 and reference should be made thereto for descriptions of these mounting procedures.

In order to join adjacent sections of the conductor assembly 10, shown in FIGURE 2, for example, the clamping assembly 40 shown in FIGURES 4a and 4b–6a and 6b is provided. In the arrangement of FIGURES 4a and 4b the clamping assembly 40 is comprised of a first rigid clamp member 41 having the arcuate-shaped projections 42 and 43. The arcuate projection 43 bears against the curved portion of the base member 11. The arcuate portion 42 is seated in a groove 15b provided in the conductive head section 15. The opposite side of clamp member 41 is provided with a flat surface 44 upon which a washer member 45 rests. The clamp member 41 is provided with a plurality of apertures (not shown) for receiving the fastening bolts 46 which extend through the apertures in clamp member 41 and likewise through the open areas between the rod 17.

The second clamp member 47 is substantially thinner than clamp member 41 and is bent to form the arcuate portions 48 and 49 which rest against the base member 11 and the groove 15c, respectively, in the manner shown in FIGURE 4a. The fastening bolts extend through suitable apertures provided in the clamp member 47 and may be tightened as much as is required. After suitable tightening, it can be seen that the projection 42 of clamping member 41 and the arcuate portion 49 of clamping member 47 provide a nesting for the current path between the adjacent sections 10 and 10′ of the conductor assemblies and act to keep the conductive head portions 15 and 15′ in perfectly straight alignment. The arcuate portions 43 and 48 of members 41 and 47, respectively, act to keep the base portions 11 and 11′ in perfect alignment.

The inherent flexibility of the clamping member 47 enables the sections 10 and 10′ to experience some relative motion due to changing climatic conditions and the like, while at the same time maintaining the integrity of the physical alignment and electrical connection between adjacent sections 10 and 10′.

As an alternative embodiment the flexible member 47 may be replaced with a second member 41 and a spring washer such as, for example, a Belleville washer 45 may be employed to provide the flexible or sliding coupling between the adjacent sections 10 and 10′. Due to the arrangement of the conductor assemblies it is not at all necessary to provide apertures in the conductor assembly since the fastening bolts may extend right through the open areas in the truss arrangements formed by the serpentine-shaped rods 17 and 17′.

In one preferred embodiment wherein the base member 11 is formed of aluminum and the head member 15 is formed of copper the clamping assembly will provide a high conductivity path between the means 11 and 15 so that both members, operating in parallel, provide maximum electrical conductivity. Thus, the serpentine rod means 17 need not be relied upon for transfer of electrical current between the means 11 and 15.

While the conductor assembly of the instant invention has been described as being extremely advantageous for use in three-phase third rail systems, it should be understood that this application is merely exemplary and any system requiring a conductor assembly having the properties of excellent conductivity, high abrasive resistance, extreme strength and rigidity and substantially diminished raw material and fabrication costs may therefore use the conductor assembly of the instant invention to great advantage. Still another preferred embodiment is shown by the conductor assembly 10' of FIGURE 1c. In the assembly 10' the conducting head means 15' is comprised of an aluminum extrusion 55 having a stainless steel outer layer 56 which provides the desired abrasive resistance. The outer layer 56 may be secured to the aluminum extrusion 55 by way of a conducting adhesive represented by the dashed line 57. As another alternative, the stainless steel outer layer 56 may be secured to the aluminum conducting head 55 by a typical welding operation, which is intermittently applied along the length of the head assembly 15'. One preferred welding procedure which may be used is a metal-inert-gas weld.

A clamping means provides adequate physical engagement and maintains the integrity of a current path between adjacent sections of conductive assemblies, while at the same time lending itself readily to a simple, easy installation to the conductive assemblies of the invention.

Hand operated tools can be employed for field use in the event a small section needs replacement due to malfunction of other electrical portions of the Transit System. A *conductor* section can thereby be replaced economically and quickly in the field without disturbing the insulating means or the conductor support element. Such a possibility does not exist in certain other conducting means wherein the conductor is joined to its support elements by a different mechanical method. Such a possibility also would not exist in other conceivable conductor means wherein the conductor head and its support are metallurgically bonded, i.e., any method wherein a utectic interface exists between differing materials.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. Means for joining conductor assemblies of the beam type to provide mechanical and electrical contact therebetween as well as alignment of said conductor assemblies; said means for joining comprising first and second metallic clamping means bridging across adjacent conductor assemblies; said conductor assemblies each comprising a base means and a conductor head means; said base means and said conductor head means being separate from each other with said base means supporting said conductor head means; said first and said second clamping means each having interlocking means cooperating with said conductor assemblies to keep the base means and conductor head means of adjacent conductor assemblies in substantially perfect alignment; said conductor head means having first and second opposite sides extending along the length of each of said conductor assemblies; said interlocking means comprising a first and second elongated notch extending, respectively, along said first and second side of said conductor head means in the direction of extension of said conductor assembly; said first clamping means having a first raised portion extending along the length thereof and shaped to fit into and being fitted into said first notch; said second clamping means having a second raised portion extending along the length thereof and shaped to fit into and being fitted into said second notch; said first and said second raised portions comprising part of said interlocking means and cooperating with said first and said second notch for holding said conductor head means of adjacent conductor assemblies in substantially perfect alignment while permitting the adjacent conductor assemblies to move toward and away from each other; fastening means passing through said first and second clamping means to rigidly secure said first and second clamping means; said first clamping means being a substantially flexible metallic member permitting relative movement between said adjacent conductor assemblies while maintaining electrical engagement therebetween.

2. Means for joining conductor assemblies of the beam type to provide mechanical and electrical contact therebetween as well as alignment of said conductor assemblies; said means for joining comprising first and second metallic clamping means bridging across adjacent conductor assemblies; said conductor assemblies each comprising a base means and a conductor head means; said base means and said conductor head means being separate from each other with said base means supporting said conductor head means; said first and said second clamping means each having having interlocking means cooperating with said conductor assemblies to keep the base means and conductor head means of adjacent conductor assemblies in substantially perfect alignment; said conductor head means having first and second opposite sides extending along the length of each of said conductor assemblies; said interlocking means comprising a first and second elongated notch extending; respectively, along said first and said second side of said conductor head means in the direction of extension of said conductor assembly; said first clamping means having a first raised portion extending along the length thereof and shaped to fit into and being fitted into said first notch; said second clamping means having a second raised portion extending along the length thereof and shaped to fiit into and being fitted into said second notch; said first and said second raised portions comprising part of said interlocking means and cooperating with said first and said second notch for holding said conductor head means of adjacent conductor assemblies in substantially perfect alignment while permitting the adjacent conductor assemblies to move toward and away from each other; fastening means passing through said first and second clamping means to rigidly secure said first and second clamping means; said first and second clamping mean being rigid metallic members; said fastening means comprising spring washer means permitting relative movement between said adjacent conductor assemblies while maintaining electrical engagement therebetween.

3. Means for joining end-to-end, conductor assemblies each being comprised of elongated base means for securing said conductive head means to a support; said elongated conductive head means formed of a relatively high conductivity material having a first surface disposed for sliding engagement with the device to be powered; truss means secured between said base means and said conductive head means for rigidly and reliably supporting said conductive head means upon said base means; said conductive head means and said base means each having a groove extending the length of said means; portions of said truss means being positioned in said grooves; said truss means comprising elongated metallic rod means formed in a serpentine configuration; said joining means comprising first and second metallic clamping means bridging across adjacent conductor assemblies; said first and second clamping means each having interlocking means cooperating with said conductor assemblies to keep the adjacent base means and conductor head means in substantially perfect alignment; fastening means passing through said first and second clamping means to rigidly secure said first and second clamping means; said first and second clamping means being rigid metallic members; said fastening means comprising spring washer means permitting relative movement between said adjacent conductor assemblies while maintaining electrical engagement therebetween.

References Cited

UNITED STATES PATENTS

| | | | |
|---|---|---|---|
| 542,135 | 7/1895 | Bond | 238—260 X |
| 1,065,488 | 6/1913 | Williams | 238—243 X |
| 1,693,359 | 11/1928 | Wichert. | |
| 1,776,367 | 9/1930 | Northey | 238—260 |
| 1,779,802 | 10/1930 | Cowan | 238—259 |
| 1,831,227 | 11/1931 | Clark | 238—259 X |
| 1,967,509 | 7/1934 | Jackson | 238—243 |
| 2,247,959 | 7/1941 | McComb | 238—260 |
| 2,538,249 | 1/1951 | Isom | 238—243 |
| 3,190,558 | 6/1965 | Griffiths | 238—243 |
| 3,222,464 | 12/1965 | Dehn | 191—22 |

OTHER REFERENCES

Yseboodt, German printed patent specification, Ser. No. 536,197 printed October 21, 1931 (Kl 19a Gr. 15), 3 pages spec., 1 sht. dwg. Copy in 238–243.

ARTHUR L. LA POINT, *Primary Examiner.*

STANLEY T. KRAWCZEWICZ, *Examiner.*